No. 685,747. Patented Nov. 5, 1901.
J. E. DARRAH.
COVER FOR COOKING UTENSILS.
(Application filed Feb. 12, 1901.)
(No Model.)

Witnesses
Jno. Munie
Gladys L. Thompson

Inventor
J. E. Darrah
By
R. A. Lacey
Attorneys

UNITED STATES PATENT OFFICE.

JOHN E. DARRAH, OF GREENFIELD, IOWA.

COVER FOR COOKING UTENSILS.

SPECIFICATION forming part of Letters Patent No. 685,747, dated November 5, 1901.

Application filed February 12, 1901. Serial No. 47,044. (No model.)

*To all whom it may concern:*

Be it known that I, JOHN E. DARRAH, a citizen of the United States, residing at Greenfield, in the county of Adair and State of Iowa, have invented certain new and useful Improvements in Covers for Cooking Utensils; and I do hereby declare the following to be a full, clear, and exact description of the invention, such as will enable others skilled in the art to which it appertains to make and use the same.

This invention has for its object to devise simple and effective means for holding the cover of a cooking vessel in place when draining off liquid and when the cover is thrown back.

For a full description of the invention and the merits thereof and also to acquire a knowledge of the details of construction of the means for effecting the result reference is to be had to the following description and drawings hereto attached.

While the essential and characteristic features of the invention are necessarily susceptible of modification, still the preferred embodiment of the invention is illustrated in the accompanying drawings, in which—

Figure 1:
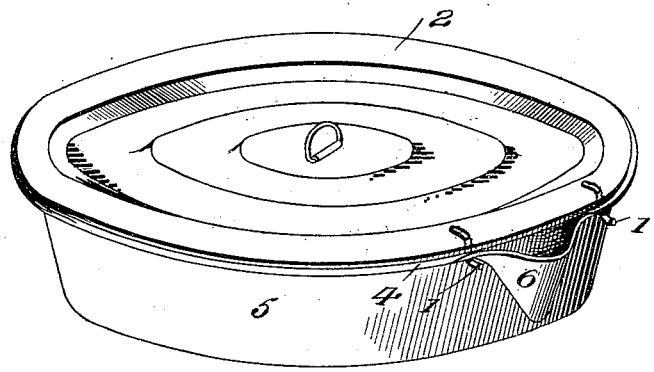
Figure 2:
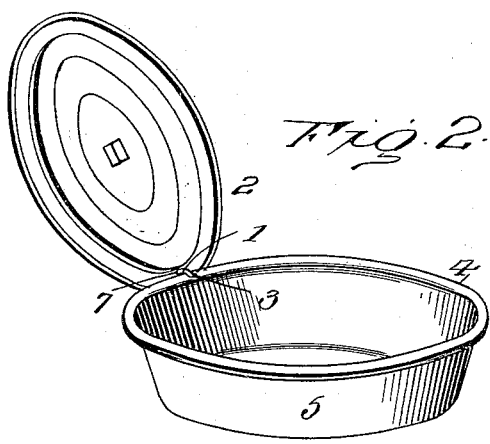
Figure 3:
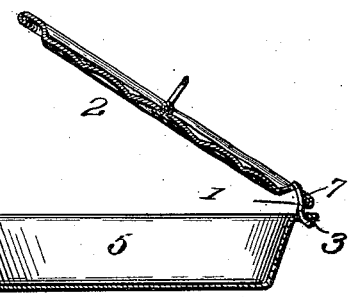
Figure 4:
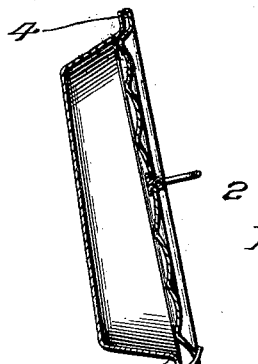

Figure 1 is a perspective view showing the invention applied to a lipped vessel. Fig. 2 is a detail view of the invention embodying a single hook, the cover being turned back. Fig. 3 is a section showing the cover held part way open. Fig. 4 is a sectional view showing the primary object of the invention.

Corresponding and like parts are referred to in the following description and indicated in all the views of the drawings by the same reference characters.

The invention is designed for application to any variety of cooking utensil generally provided with a cover, the purpose being to provide positive interlocking means between the vessel and the cover to prevent slipping of the latter when the vessel is turned to drain off liquid from solid articles. This manner of draining off water and other liquids from vegetables and other articles of food is commonly resorted to, and any slipping of the cover during the draining process usually results in a spilling or loss of some of the food, besides endangering the hand of the person to scalding.

In accordance with this invention interlocking means of novel formation are provided between the cover and vessel to prevent accidental displacement of the cover and yet admit of ready detachment of the cover from the vessel when required and which will hold the cover when thrown back or at an intermediate position, as clearly illustrated and as will be set forth more fully hereinafter.

One or more hooks 1 are applied to the outer portion of the cover 2 and are adapted to coöperate with corresponding openings 3 in the outer rim 4 at the top edge of the vessel or cooking utensil 5. One hook and opening will suffice in the event of the vessel or cooking utensil being devoid of a lip or spout; but in the event of the vessel having a lip or spout 6 it has been found desirable to provide two hooks and two openings, a hook and opening being located upon each side of the lip or spout. This is shown most clearly in Fig. 1.

The hook 1 may be attached to the cover in any desired or substantial manner and, as shown, has an end portion passed through a perforation 7 and soldered to the top side of the cover. The hook in elevation is approximately of S form, the bent portions extending in diametrically opposite directions. The end attached or soldered to the cover projects inward, whereas the opposite end projects outward to engage with the rim 4 of the vessel 5. The hook is preferably formed of a short length of wire of suitable gage, and its outer end portion is bent so as to engage with the rim portion of the vessel and hold the cover when thrown back, as shown in Fig. 2, or supported when opened part way, as indicated in Fig. 3. When the cover is turned to the position about as shown in Fig. 3, water of condensation drips back into the vessel and does not drop upon the stove, table, or other support upon which the vessel may be placed, and this is of advantage, since it admits of the contents of the vessel being inspected without requiring the cover to be entirely removed or thrown open to the position shown in Fig. 2. Hence a great portion of the steam is prevented from escaping into the room by being condensed, the water of condensation passing back into the vessel. The employment of two hooks and corresponding openings insures greater steadiness of the cover when opened to either position shown in Figs. 2 and 3, besides spanning the lip or spout, so as not to interfere with the free escape of the liquid when the utensil is turned to drain off the liquid from the food or articles being cooked. There is sufficient play between the hook 1 and rim 4 to admit of the cover 2 falling away from the rim when the vessel is turned to drain off the liquid. This is clearly shown in Fig. 4.

Having thus described the invention, what is claimed as new is—

In combination with a cooking utensil or vessel having an outwardly-extending rim provided with an opening, and a cover having a corresponding opening, a hook formed of a single length of wire bent into approximately S form and having an end portion thrust through the opening of the cover and soldered on the top side thereof and adapted to have its opposite end portion make detachable connection with the rim of the vessel by coöperation with the opening therein and constructed to support said cover when opened part way or when thrown back, substantially as set forth.

In testimony whereof I affix my signature in presence of two witnesses.

JOHN E. DARRAH. [L. S.]

Witnesses:
ANNAS BARNARD,
E. S. FOSTER.